US008831820B2

(12) United States Patent
Sato

(10) Patent No.: US 8,831,820 B2
(45) Date of Patent: Sep. 9, 2014

(54) VEHICLE GROUP CONTROL METHOD AND VEHICLE GROUP CONTROL DEVICE

(75) Inventor: Kunihito Sato, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 426 days.

(21) Appl. No.: 12/999,165

(22) PCT Filed: Jan. 28, 2009

(86) PCT No.: PCT/JP2009/051349

§ 371 (c)(1),
(2), (4) Date: Dec. 15, 2010

(87) PCT Pub. No.: WO2010/086968

PCT Pub. Date: Aug. 5, 2010

(65) Prior Publication Data

US 2011/0276220 A1 Nov. 10, 2011

(51) Int. Cl.
*G06F 7/00* (2006.01)
*G08G 1/16* (2006.01)
*G08G 1/00* (2006.01)

(52) U.S. Cl.
CPC ... *G08G 1/16* (2013.01); *G08G 1/22* (2013.01)
USPC ......................... 701/31.4; 340/5.64; 340/5.72

(58) Field of Classification Search
CPC ...... B60Q 1/1669; B60Q 1/323; B60R 25/24; B60R 25/246; B60R 25/2009
USPC ................ 701/33.5, 96, 117, 24, 300, 301, 1; 342/457, 458; 340/435, 5.72, 425.5, 340/5.64, 426.15; 370/328
See application file for complete search history.

(56) References Cited

U.S. PATENT DOCUMENTS 6,397,149 B1 * 5/2002 Hashimoto .................... 701/300
6,813,561 B2 * 11/2004 MacNeille et al. ........... 701/470
2002/0059017 A1 5/2002 Yamane et al.
2006/0155428 A1 * 7/2006 Imai .................................. 701/1

FOREIGN PATENT DOCUMENTS

| | | |
|---|---|---|
| CN | 1301001 A | 6/2001 |
| JP | A-10-293899 | 11/1998 |
| JP | A-11-283180 | 10/1999 |
| JP | A-2001-344685 | 12/2001 |
| JP | A-2001-357491 | 12/2001 |
| JP | 2002-123894 A | 4/2002 |
| JP | A-2006-21632 | 1/2006 |
| JP | 2008-204094 A | 9/2008 |

OTHER PUBLICATIONS

International Search Report issued in International Application No. PCT/JP2009/051349 on Apr. 28, 2009 (with translation).

* cited by examiner

*Primary Examiner* — Marthe Marc-Coleman
(74) *Attorney, Agent, or Firm* — Oliff PLC

(57) ABSTRACT

A vehicle group control device for controlling the arrangement of vehicles within a vehicle group including plural vehicles, the vehicle group control device including: a periphery monitoring performance grasping unit which grasps a periphery monitoring performance of each vehicle constituting the vehicle group; and an arrangement determination unit which determines the arrangement of the vehicles within the vehicle group on the basis of the periphery monitoring performance of each vehicle. Accordingly, since the periphery monitoring performance of each vehicle within the vehicle group is grasped and the arrangement of the vehicles within the vehicle group can be determined on the basis of the periphery monitoring performance of each vehicle, it is possible to efficiently drive the entire vehicle group.

8 Claims, 5 Drawing Sheets

VEHICLE $C_1$

PERIPHERY MONITORING PERFORMANCE $A_1$ : 2
MOVEMENT PERFORMANCE $B_1$ : 6

VEHICLE $C_2$

PERIPHERY MONITORING PERFORMANCE $A_2$ : 5
MOVEMENT PERFORMANCE $B_2$ : 7

VEHICLE $C_3$

PERIPHERY MONITORING PERFORMANCE $A_3$ : 1
MOVEMENT PERFORMANCE $B_3$ : 2

VEHICLE GROUP CONTROL METHOD AND VEHICLE GROUP CONTROL DEVICE

TECHNICAL FIELD

The present invention relates to a method of controlling a vehicle group and a device thereof.

BACKGROUND ART

For some time, as a method or device for controlling the arrangement of a vehicle group, there has been known a method or device for acquiring braking distances of the other vehicles via vehicle-to-vehicle communication within the vehicle group and disposing a vehicle having a longer braking distance to a position closer to the head of the vehicle group (for example, refer to Patent Literature 1).

[Patent Literature 1] Japanese Unexamined Patent Application Publication No. H10-293899

SUMMARY OF INVENTION

Technical Problem

However, in the known method or device, there is a concern that the vehicle group may not be efficiently driven since the driving function of the entire vehicle group is restricted by the performance of the vehicle disposed at the head of the vehicle group and having the longest braking distance. For example, it is difficult to drive the vehicle group while the vehicle-to-vehicle distance is controlled to be short.

Therefore, the invention is contrived to solve the above-described technical problems, and an object of the invention is to provide a vehicle group control method and a vehicle group control device capable of determining the arrangement of vehicles so that the vehicle group is able to be efficiently driven.

Solution to Problem

That is, according to the invention, provided is a vehicle group control method of controlling the arrangement of vehicles within a vehicle group including plural vehicles, the vehicle group control method including: grasping a periphery monitoring performance of each vehicle constituting the vehicle group; and determining the arrangement of the vehicles within the vehicle group on the basis of the periphery monitoring performance of each vehicle.

In accordance with the vehicle group control method according to the invention, it is possible to grasp the vehicle periphery monitoring performance for each vehicle within the vehicle group, and to determine the arrangement of the vehicles within the vehicle group on the basis of the periphery monitoring performance of each vehicle. For example, since the vehicle disposed at the rear side of the vehicle group is able to use the driving results of plural leading vehicles, when the arrangement of the vehicles within the vehicle group is determined in accordance with the periphery monitoring performance of the vehicle, it is possible to efficiently drive the entire vehicle group.

Here, in the grasping of the periphery monitoring performance, the periphery monitoring performance may be grasped on the basis of information representing whether the vehicle includes information acquiring equipment, the performance of the information acquiring equipment included in the vehicle, the precision of information acquired by the vehicle, or the quantity of information acquired by the vehicle. With such a configuration, it is possible to appropriately grasp the vehicle periphery monitoring performance on the basis of, for example, whether a sensor or the like is included in the vehicle or the precision and the quantity of information acquired by the sensor or the like or acquired by communication or the like.

Further, in the determining the arrangement, the vehicle may be disposed at a position closer to the head of the vehicle group as its periphery monitoring performance becomes higher. Likewise, since the vehicle having the low periphery monitoring performance is able to use the information obtained by the leading vehicle by disposing the vehicle having the higher periphery monitoring performance at a position closer to the head of the vehicle group, it is possible to efficiently drive the entire vehicle group.

Furthermore, the vehicle group control method further includes: grasping a movement performance of each vehicle constituting the vehicle group, wherein in the determining the arrangement, the arrangement of the vehicles within the vehicle group may be determined on the basis of the movement performance and the periphery monitoring performance of each vehicle. With such a configuration, since it is possible to determine the arrangement of the vehicle group on the basis of the vehicle movement performance and the benefit obtained by information, it is possible to more efficiently drive the entire vehicle group.

Moreover, according to the invention, provided is a vehicle group control device for controlling the arrangement of vehicles within a vehicle group including plural vehicles, the vehicle group control device including: a periphery monitoring performance grasping unit which grasps a periphery monitoring performance of each vehicle constituting the vehicle group; and an arrangement determination unit which determines the arrangement of the vehicles within the vehicle group on the basis of the periphery monitoring performance of each vehicle. Here, the periphery monitoring performance grasping unit may grasp the periphery monitoring performance on the basis of whether the vehicle includes information acquiring equipment, the performance of the information acquiring equipment included in the vehicle, the precision of information acquired by the vehicle, or the quantity of information acquired by the vehicle. Further, the arrangement determination unit may dispose the vehicle at a position closer to the head of the vehicle group as its periphery monitoring performance becomes higher. Furthermore, the vehicle group control device further includes: a movement performance grasping unit which grasps a movement performance of each vehicle constituting the vehicle group, wherein the arrangement determination unit may determine the arrangement of the vehicles within the vehicle group on the basis of the movement performance and the periphery monitoring performance of each vehicle.

It is supposed that the vehicle group control device according to the invention exhibits the same advantage as that of the above-described vehicle control method.

Advantageous Effects of Invention

According to the invention, it is possible to determine the vehicle arrangement in which the vehicle group can be efficiently driven.

REFERENCE SIGNS LIST

Figure 1:
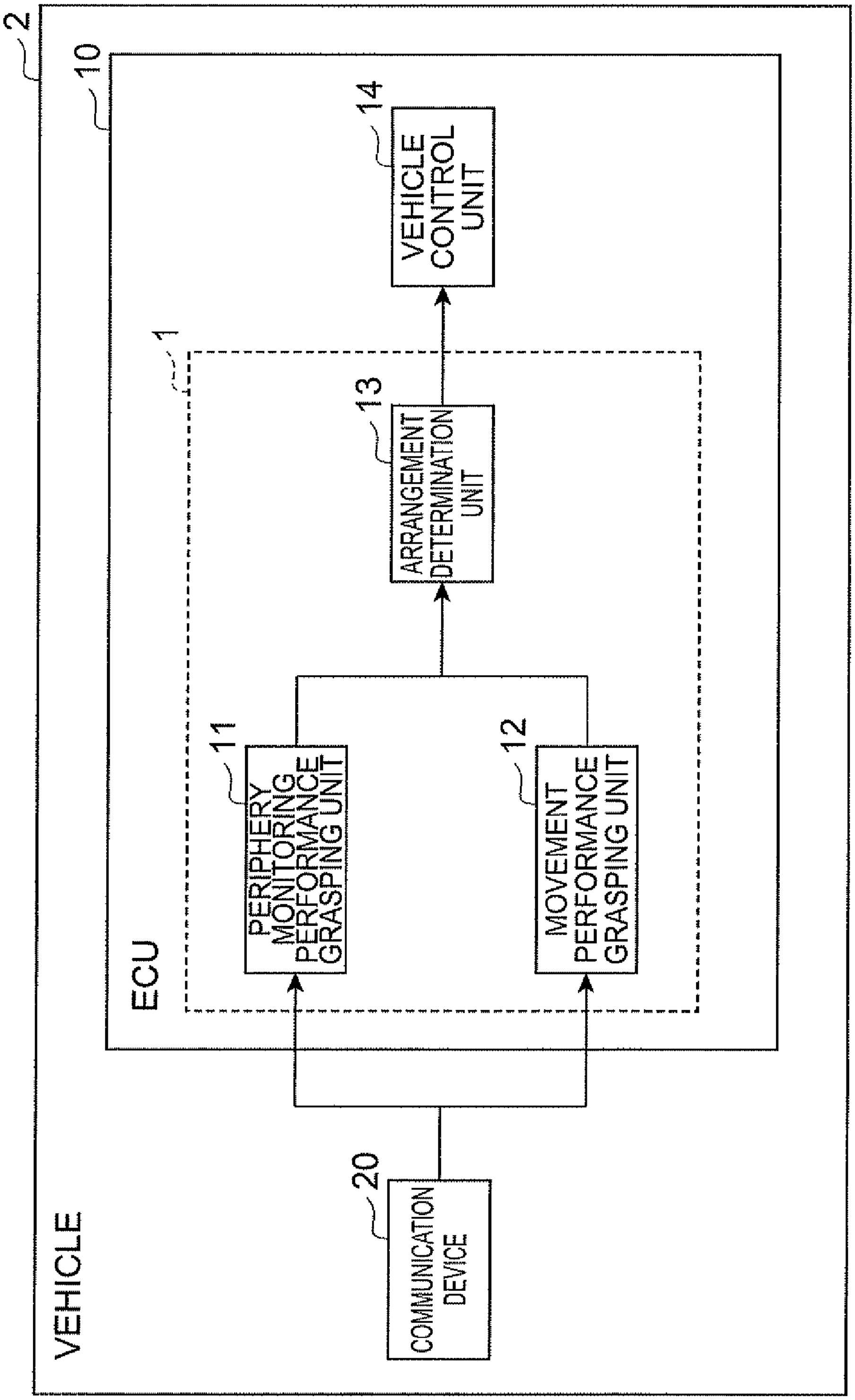
FIG. 1 is a block diagram illustrating a configuration outline of a vehicle including a vehicle group control unit according to an embodiment.

1: VEHICLE GROUP CONTROL UNIT (VEHICLE GROUP CONTROL DEVICE)
2: VEHICLE
10: ECU
11: PERIPHERY MONITORING PERFORMANCE GRASPING UNIT
12: MOVEMENT PERFORMANCE GRASPING UNIT
13: ARRANGEMENT DETERMINATION UNIT
14: VEHICLE CONTROL UNIT
20: COMMUNICATION DEVICE

DESCRIPTION OF EMBODIMENTS

Hereinafter, an embodiment of the invention will be described with reference to the accompanying drawings. Further, in the respective drawings, the same reference numerals will be given to the same or equivalent components, and the repetitive description thereof will be omitted.

A vehicle group control method and a vehicle group control device (a vehicle group control unit) according to the embodiment are a device that determines the arrangement positions of vehicles when plural vehicles are driven while forming a vehicle group or a line, and are appropriately adopted in a vehicle equipped with a driving assist system performing, for example, autonomous automatic driving.

First, the outline of a vehicle including a vehicle group control unit according to the embodiment will be described. FIG. 1 is an outline diagram illustrating a vehicle including a vehicle group control unit 1 according to the embodiment. A vehicle 2 shown in FIG. 1 includes a communication device 20 and an ECU 10.

The communication device 20 has a function of communicating with a communication device outside the vehicle. For example, the communication device is configured to perform vehicle-to-vehicle communication with communication devices mounted on the other vehicles, and has a function of receiving information acquired by the other vehicles, equipment information of the other vehicles, movement performance information, or the like.

The information acquired by the other vehicles includes accelerated/decelerated speed information or steering information acquired by sensors installed in the other vehicles, geographical information acquired from an information center performing a traffic management via a road-vehicle communication, and the like. Further, the equipment information is information representing whether the vehicle includes a vehicle environment detecting sensor, the type of the vehicle environment detecting sensor, the available service type of the navigation system, and the like, and is acquired from, for example, the specification information of the other vehicles. Examples of the vehicle environment detecting sensor include a laser sensor or a millimeter-wave sensor detecting a vehicle-to-vehicle distance with respect to the peripheral vehicle, an image sensor acquiring peripheral image information, and the like. Further, examples of the available service type of the navigation system include a nonmember information provision service, a member information provision service providing more precise information and having a large amount of information, and the like. Furthermore, the movement performance information is information representing a braking performance, an acceleration performance, a steering performance, and the like or information representing whether the driving assist system is present, and is acquired from specification information or actual measurement information, or the like. The driving assist system is an assist system involving with a vehicle movement, and examples thereof include a VDIM (Vehicle Dynamics Integrated Management), a VSC (Vehicle Stability Control), an ABS (Antilock Brake System), a TRC (Traction Control), and the like. Further, the communication device 20 has a function of outputting the acquired information to the ECU 10.

The ECU 10 includes a periphery monitoring performance grasping unit 11, a movement performance grasping unit 12, an arrangement determining unit 13, and a vehicle control unit 14. The periphery monitoring performance grasping unit 11, the movement performance grasping unit 12, and the arrangement determining unit 13 constitute the vehicle group control unit 1.

The periphery monitoring performance grasping unit 11 has a function of grasping the periphery monitoring performances of its own vehicle and the other vehicles. For example, the periphery monitoring performance grasping unit 11 has a function of grasping the periphery monitoring performances of its own vehicle and the other vehicles on the basis of the equipment information of its own vehicle and the other vehicles. For example, the periphery monitoring performance grasping unit 11 has a table where marks (points) are allocated to each equipment, and has a function of evaluating the periphery monitoring performances of the other vehicles by marking the equipment included in the other vehicles using numerical values so as to correspond to the equipment shown in the equipment information of the other vehicles acquired by the communication device 20. Further, the points may be weighted depending on the function of the equipment. For example, since the millimeter-wave sensor has higher detection precision than that of the laser sensor, a higher points value is set. Further, for example, the points may be weighted in accordance with the number of sensors. The periphery monitoring performance grasping unit has a function of evaluating the periphery monitoring performance of the own vehicle on the basis of the specification information of the own vehicle as in the other vehicles. Further, the periphery monitoring performance grasping unit 11 has a function of outputting the grasped periphery monitoring performances of the own vehicle and the other vehicles to the arrangement determination unit 13.

The movement performance grasping unit 12 has a function of grasping the movement performances of its own vehicle and the other vehicles. For example, the movement performance grasping unit 12 has a function of grasping the movement performances of its own vehicle and the other vehicles on the basis of the movement performance information of its own vehicle and the other vehicles. For example, the movement performance grasping unit 12 has a table where points are allocated to each equipment or performance, and has a function of evaluating the movement performances of the other vehicles by marking the equipment or performances included in the other vehicles using numerical values so as to correspond to the equipment or performances shown in the movement performance information of the other vehicles acquired by the communication device 20. Further, the movement performance grasping unit has a function of evaluating the movement performance of its own vehicle on the basis of the specification information or the actual measurement data of its own vehicle as in the other vehicles. Furthermore, the movement performance grasping unit 12 has a function of outputting the grasped movement performances of its own vehicle and the other vehicles to the arrangement determination unit 13.

The arrangement determination unit 13 has a function of determining the arrangement within the vehicle group on the basis of the periphery monitoring performances and the movement performances of the vehicles constituting the vehicle group. For example, the arrangement determination unit 13 has a function of grasping the arrangement point value of the corresponding vehicle on the basis of the periphery monitoring performance and the movement performance for each vehicle within the vehicle group, and determining the arrangement within the vehicle group so that the vehicle having the higher arrangement point value is disposed at a position closer to the head of the vehicle group. Here, the arrangement point value is a numerical value that is used to determine the arrangement within the vehicle group, and is calculated in consideration of the periphery monitoring performance, the driving environment, and the like as well as the movement performance. For example, the arrangement point value is calculated by multiplying an integer, determined by the driving environment, by the movement performance and the periphery monitoring performance and adding multiplied results to each other. Further, the arrangement determination unit 13 has a function of outputting the determined arrangement within the vehicle group to the vehicle control unit 14.

The vehicle control unit 14 has a function of performing a driving control of the vehicle 2 on the basis of the arrangement position output from the arrangement determination unit 13. For example, when the arrangement position within the vehicle group changes, the vehicle control unit controls the driving of the vehicle 2 so that the changed arrangement is realized by the steering control, the brake control, the accelerator control, and the like. Further, the vehicle control unit 14 has a function of inputting the information acquired by the other vehicles via the communication device 20 and controlling the vehicle by reflecting the information in the driving plan of its own vehicle.

Figure 2:
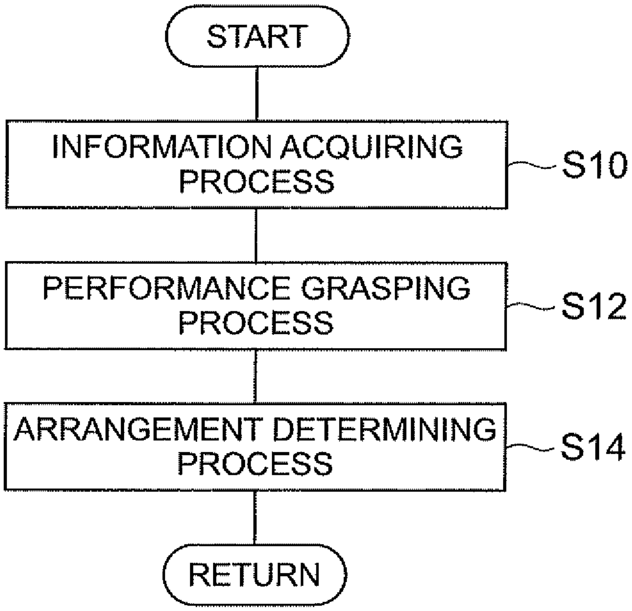
FIG. 2 is a flowchart illustrating an operation of the vehicle group control unit of FIG. 1.

Next, the operation of the vehicle group control unit 1 according to the embodiment will be described. FIG. 2 is a flowchart illustrating the operation of the vehicle group control unit 1 according to the embodiment. The control process shown in FIG. 2 is repetitively performed at a predetermined interval, for example, after the ignition is turned on or the execution button installed in the vehicle 2 is turned on.

When the control process shown in FIG. 2 starts, the vehicle group control unit 1 starts an information acquiring process (S10). The process of S10 is a process which is performed by the periphery monitoring performance grasping unit 11 and the movement performance grasping unit 12, and acquires the movement performance information and the equipment information of the vehicle constituting the vehicle group. For example, the periphery monitoring performance grasping unit 11 and the movement performance grasping unit 12 acquire the movement performance information and the equipment information of the peripheral vehicle output from the communication device 20. Further, the periphery monitoring performance grasping unit 11 and the movement performance grasping unit 12 acquire the movement performance information and the equipment information of the own vehicle on the basis of the specification information, the actual measurement data, or the like of their own vehicle.

For example, the information representing whether the vehicle-to-vehicle distance sensor is installed in the vehicle is acquired as the equipment information. Then, when the vehicle-to-vehicle distance sensor is installed in the vehicle, the type of sensor such as a laser sensor and a millimeter-wave sensor is acquired. Further, the information representing whether the vehicle is the member of the information transmission service is acquired. Furthermore, as the movement performance information, for example, information representing a braking performance such as a braking distance or a maximal deceleration, information representing an acceleration performance such as maximal acceleration or responsiveness, information representing a turning performance such as a turning radius, and information representing whether the driving assist system is installed in the vehicle are input. When the process of S10 ends, each of performance grasping processes is performed (S12).

The process of S12 is a process which is performed by the periphery monitoring performance grasping unit 11 and the movement performance grasping unit 12, and grasps the movement performance or the periphery monitoring performance of the vehicle constituting the vehicle group. The periphery monitoring performance grasping unit 11 grasps the periphery monitoring performance of the vehicle by using a table in which points are allocated to each device in advance. The periphery monitoring performance grasping unit 11 evaluates the periphery monitoring performances of the own vehicle and the other vehicles as points so as to correspond to the table and the equipment information of the own vehicle and the other vehicles. In addition, the movement performance grasping unit 12 grasps the movement performance of the vehicle by using a table in which points are allocated to each performance and equipment in advance. The movement performance grasping unit 12 evaluates the periphery monitoring performances of its own vehicle and the other vehicles as points so as to correspond to the table and the movement performance information of its own vehicle and the other vehicles.

Figure 3:
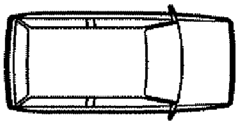
FIG. 3 is an outline diagram illustrating an operation of the vehicle group control unit of FIG. 1.
Figure 3:
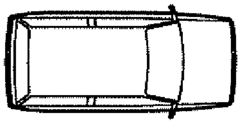
Figure 3:
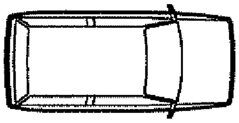

Here, the process of S12 will be described in detail with reference to FIG. 3. FIG. 3 is an outline diagram illustrating a performance of each vehicle constituting the vehicle group. Further, in consideration of convenience of the description, a case will be described in which the table included in the periphery monitoring performance grasping unit 11 is foamed as below. For example, the table is formed such that zero points are allocated to a vehicle that does not have a vehicle-to-vehicle distance sensor, one point is allocated to a vehicle that has a laser sensor, two points are allocated to a vehicle that has a millimeter-wave sensor, zero points are allocated to a vehicle that does not have an image sensor, one point is allocated to a vehicle that has an image sensor only at the front or rear thereof, two points are allocated to a vehicle that has an image sensor at each of the front and rear thereof, zero points are allocated to a vehicle that is not able to acquire information from an information center, one point is allocated to a vehicle that is able to acquire general information from the information center, and two points are allocated to a vehicle that is able to acquire member information from the information center.

Further, a case will be described in which the table included in the movement performance grasping unit 12 is formed as below. For example, the table is formed such that one point is allocated to the case where a braking performance evaluated by a braking distance or maximal deceleration is low, two points are allocated to the case where the evaluated braking performance is medium, three points are allocated to the case where the evaluated braking performance is high, one point is allocated to the case where an acceleration performance evaluated by maximal acceleration or responsiveness is low, two points are allocated to the case where the evaluated acceleration performance is medium, three points are allocated to the case where the evaluated acceleration performance is high, one point is allocated to the case where a turning performance evaluated by a turning radius or the like is low, two points are allocated to the case where the evaluated turning performance is medium, three points are allocated to the case where the evaluated turning performance is high, and one point is allocated whenever a system such as an ABS is further provided.

Further, regarding a vehicle $C_1$, it is assumed that a millimeter-wave sensor and an ABS are provided as equipment, a braking performance and an acceleration performance are medium, and a turning performance is low. In this case, when a periphery monitoring performance $A_1$ of the vehicle $C_1$ is calculated by correlating the table with the configuration of the vehicle $C_1$, two points are allocated due to the millimeter-wave sensor. Further, a movement performance $B_1$ of the vehicle $C_1$ is six points when adding up two points for the braking performance, two points for the acceleration performance, one point for the turning performance, and one point for the ABS in accordance with the correlation between the table and the configuration or the actual measurement data of the vehicle $C_1$. The periphery monitoring performances and the movement performances of the vehicles $C_2$ and $C_3$ are calculated in the same way. Here, for convenience of the description, it is assumed below that a periphery monitoring performance $A_2$ of the vehicle $C_2$ is five points, a movement performance $B_2$ thereof is seven points, a periphery monitoring performance $A_3$ of the vehicle $C_3$ is one point, and a movement performance $B_3$ thereof is two points. When the process of S12 ends, an arrangement determining process is performed (S14).

The process of S14 is a process which is performed by the arrangement determination unit 13 and determines the arrangement of the vehicles within the vehicle group. The arrangement determination unit 13 calculates the arrangement point value in consideration of the driving environment, the movement performance, and the periphery monitoring performance calculated in the process of S14, and determines the arrangement of the vehicles. Here, the arrangement point value $\gamma_n$ can be expressed by the following equation 1, for example, when the periphery monitoring performance of the vehicle $C_n$ (n: integer) is denoted by $A_n$, the coefficient of the periphery monitoring performance $A_n$ is denoted by $K_A$, the movement performance is denoted by $B_n$, and the coefficient of the movement performance is denoted by $K_B$.

$$\gamma_n = A_n \cdot K_A + B_n \cdot K_B \quad (1)$$

Further, the coefficients $K_A$ and $K_B$ are appropriately set in accordance with the driving environment. The arrangement determination unit 13 calculates the arrangement point value $\gamma_n$ of each vehicle by using the equation 1, and determines the arrangement of the vehicle group so that the vehicle having the higher arrangement point value $\gamma_n$ is located at a position closer to the head of the vehicle group.

Figure 4:
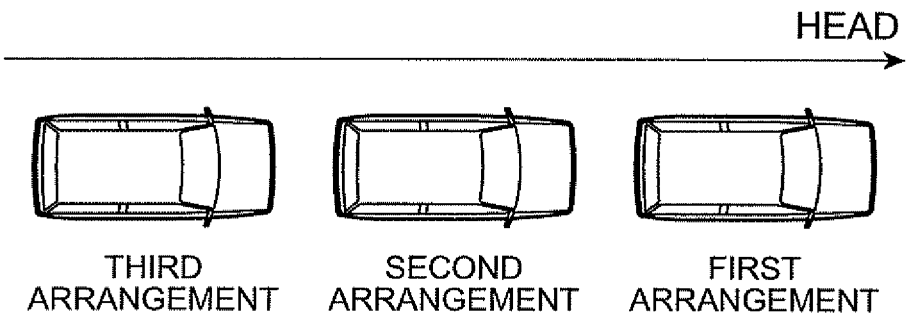
FIG. 4 is an outline diagram illustrating an operation of the vehicle group control unit of FIG. 1.

Here, for example, a case will be described with reference to FIGS. 3 and 4, in which the driving environment is set to a normal driving environment, and the coefficients $K_A$ and $K_B$ are set to 1. FIG. 4 is an outline diagram illustrating the arrangement within the vehicle group. In this case, the arrangement point value $\gamma_1$ of the vehicle $C_1$ is eight points, the arrangement point value $\gamma_2$ of the vehicle $C_2$ is twelve points, and the arrangement point value $\gamma_3$ of the vehicle $C_3$ is three points in accordance with FIG. 3 and the equation 1. Accordingly, the arrangement determination unit 13 determines the arrangement within the vehicle group so that the vehicle $C_2$ having the highest arrangement point value among the vehicles $C_1$ to $C_3$ is set to the first arrangement as the head of the vehicle group, the vehicle $C_1$ having the second highest arrangement point value among the vehicles $C_1$ to $C_3$ is set to the second arrangement in rear of the first arrangement, and the vehicle $C_3$ having the third highest arrangement point value among the vehicles $C_1$ to $C_3$ is set to the third arrangement in rear of the second arrangement. Likewise, in the case of the normal driving environment, the vehicle having the highest arrangement point value $\gamma_n$, that is, the vehicle having the highest information monitoring performance or the highest movement performance is located at a position closer to the head of the vehicle group. For this reason, the rearmost vehicle $C_3$ is able to perform vehicle control by using the information acquired by the leading vehicles $C_1$ and $C_2$ having the high periphery monitoring performances. In addition, the rearmost vehicle $C_3$ is able to perform the vehicle control by using the actual driving results of the vehicles $C_1$ and $C_2$ having the high movement performances. Accordingly, it is possible to form a vehicle group having a high information acquiring rate. Further, the information acquiring rate indicates a degree of benefit obtained by the information, and is calculated as one, for example, when a motorcycle is driven.

On the other hand, for example, when the vehicle is driven on a road surface having a small friction coefficient, the coefficients $K_A$ and $K_B$ may be respectively set to 1 and −1 in advance. With such a configuration, the arrangement point value $\gamma_1$ of the vehicle $C_1$ is minus four points, the arrangement point value $\gamma_2$ of the vehicle $C_2$ is minus two points, and the arrangement point value $\gamma_3$ of the vehicle $C_3$ is minus one point in accordance with FIG. 3 and the equation 1. Accordingly, the arrangement determination unit 13 determines the arrangement within the vehicle group so that the vehicle $C_3$ having the highest arrangement point value among the vehicles $C_1$ to $C_3$ is set to the first arrangement as the head of the vehicle group, the vehicle $C_2$ having the second highest arrangement point value among the vehicles $C_1$ to $C_3$ is set to the second arrangement in rear of the first arrangement, and the vehicle $C_1$ having the third highest arrangement point value among the vehicles $C_1$ to $C_3$ is set to the third arrangement in rear of the second arrangement. Likewise, in the case of the road surface having the low friction coefficient, the coefficient $K_B$ involving with the movement performance is controlled, and the vehicle having the higher arrangement point value $\gamma_n$, that is, the vehicle having the higher information monitoring performance or the lowest movement performance is located at a position closer to the head of the vehicle group. For this reason, since the rearmost vehicle $C_3$ is able to perform vehicle control by using the information acquired by the leading vehicles $C_1$ and $C_2$ having the high periphery monitoring performances, it is possible to form a vehicle group having a high information acquiring rate using the information acquired from the leading vehicle. Further, since the rearmost vehicle $C_3$ is a vehicle having a high movement performance, even when slipping or the like occurs in the leading vehicle, the rearmost vehicle is able to avoid the slipping or the like. For this reason, it is possible to form a vehicle group in which each vehicle is able to sufficiently exhibit the movement performance. When the process of S14 ends, the control process shown in FIG. 2 ends.

As described above, since the control process shown in FIG. 2 is performed, it is possible to form a vehicle group in which the information acquiring rate using the information acquired from the leading vehicles is high, and to form a vehicle group in which the movement performance of each vehicle is sufficiently exhibited. For this reason, it is possible to perform the efficient vehicle group driving in which, for example, the vehicle-to-vehicle distance is short.

Figure 5:
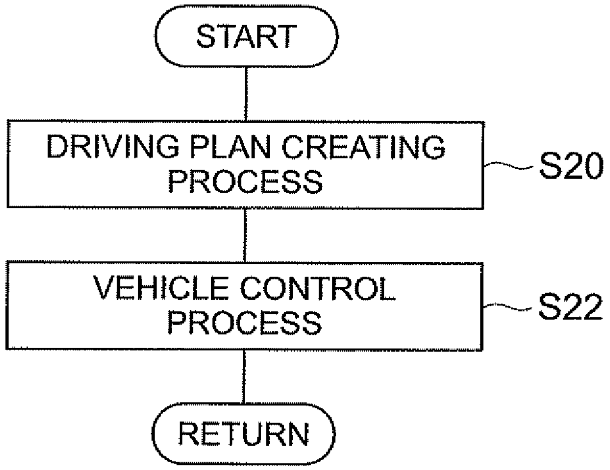
FIG. 5 is a flowchart illustrating an operation of the vehicle of FIG. 1.

Next, the driving control of the vehicle 2 including the vehicle group control unit according to the embodiment will be described. FIG. 5 is a flowchart illustrating the operation of the vehicle 2 including the vehicle group control unit according to the embodiment. The control process shown in FIG. 5 is repetitively performed at a predetermined interval, for example, after the ignition is turned on or the execution button installed in the vehicle 2 is turned on.

The vehicle control unit 14 starts a driving plan creating process (S20). The process of S20 is a process which creates a driving plan of the vehicle 2. The vehicle control unit 14 creates a driving plan up to a position distant from a current position by a predetermined distance (for example, several hundreds of meters). For example, the vehicle control unit plans driving so that the vehicle arrangement determined by the control process shown in FIG. 2 is realized. Further, the vehicle control unit 14 acquires a vehicle status quantity of each of the leading vehicles via the communication device 20. Examples of the vehicle status quantity include an acceleration/deceleration speed, a steering amount, a lateral acceleration, a vertical acceleration, and the like. The vehicle control unit 14 memorizes a position where for example, the vehicle status quantity of each leading vehicle commonly changes, and reflects the position in the driving plan. For example, when the steering of the leading vehicle is performed at the common position, it is expected that an obstacle or a hole is present at the road surface of the position. The vehicle control unit 14 creates a driving plan so that for example, the same vehicle control as that of the leading vehicle is performed at the position where the vehicle status quantity of the leading vehicle commonly changes. When the process of S20 ends, the vehicle control process is performed (S22).

The process of S22 is a process which is performed by the vehicle control unit 14 and performs a feed-forward control on the vehicle 2 on the basis of the driving plane created by the process of S22. When the process of S22 ends, the control process shown in FIG. 5 ends.

As described above, since the control process shown in FIG. 5 is performed, it is possible to acquire highly precise information from the leading vehicle. For this reason, since the entire vehicle group is able to use the high information monitoring performance of the leading vehicle, it is possible to perform the feed-forward control with high gain. For example, since it is possible to acquire the necessary braking position in advance, the rear vehicle may know the necessary braking position in consideration of the performance of the own vehicle. For this reason, it is possible to drive the vehicle with a short vehicle-to-vehicle distance, and to efficiently drive the vehicle group.

As described above, in accordance with the vehicle group control device 1 and the vehicle group control method according to the embodiment, it is possible to grasp the vehicle periphery monitoring performance for each vehicle within the vehicle group, and to determine the arrangement of the vehicles within the vehicle group on the basis of the periphery monitoring performance for each vehicle. For this reason, the vehicle having a low information monitoring performance is disposed at the rear side of the vehicle group, and acquires information from the leading vehicle, thereby enabling the entire vehicle group to use the high information monitoring performance of the leading vehicle. Accordingly, the entire vehicle group can be efficiently driven.

Further, in accordance with the vehicle group control device 1 and the vehicle group control method according to the embodiment, it is possible to appropriately grasp the vehicle periphery monitoring performance on the basis of, for example, whether a sensor or the like is included in the vehicle or the precision and the quantity of information acquired by the sensor or the like or acquired by communication or the like.

Furthermore, in accordance with the vehicle group control device 1 and the vehicle group control method according to the embodiment, since it is possible to determine the arrangement of the vehicle group on the basis of the vehicle movement performance and the benefit obtained by information, it is possible to more efficiently drive the entire vehicle group. Further, since it is possible to determine how the movement performance is reflected in the vehicle arrangement depending on the driving environment status or the like, it is possible to more efficiently drive the entire vehicle group.

Moreover, the above-described embodiment illustrates an example of the vehicle group control device and the vehicle group control method according to the invention. The vehicle group control device and the vehicle group control method according to the invention are not limited to the vehicle group control device and the vehicle group control method according to the embodiment. The vehicle group control device and the vehicle group control method according to the embodiment may be modified within the scope not departing from the concept described in the claims, or may be used in other applications.

For example, in the above-described embodiment, the automatic driving vehicle is exemplified, but a manual driving vehicle may be exemplified. In this case, when a notification unit such as a display or a speaker is provided, it is possible to notify the arrangement in which a request of a driver or passenger can be realized as much as possible. Further, in the case of the manual driving, the vehicle control unit 14 shown in FIG. 1 may not be provided.

Further, in the above-described embodiment, an example has been described in which the arrangement position of each vehicle is autonomously determined. However, for example, a predetermined vehicle within the vehicle group or a roadside assist device may integrate information of each vehicle and determine the arrangement position of each vehicle, thereby informing each vehicle of the determined arrangement position.

Furthermore, in the above-described embodiment, weighting is not given to each driving assist system. However, for example, in accordance with the type of the driving assist system, three points may be allocated to VDIM, and two points may be allocated to VSC.

Moreover, in the above-described embodiment, an example has been described in which three vehicles constitute the vehicle group, but the advantage of the invention may be obtained as long as plural vehicles are present.

The invention claimed is:

1. A vehicle group control method that is executed by a processor to control an arrangement of vehicles within a vehicle group including plural vehicles, the vehicle group control method comprising:

grasping a periphery monitoring performance of each vehicle constituting the vehicle group; and determining the arrangement of the vehicles within the vehicle group on the basis of the periphery monitoring performance of each vehicle.

2. The vehicle group control method according to claim 1, wherein in the grasping of the periphery monitoring performance, the periphery monitoring performance is grasped on the basis of information representing whether the vehicle includes information acquiring equipment, a performance of the information acquiring equipment included in the vehicle, a precision of information acquired by the vehicle, or a quantity of information acquired by the vehicle.

3. The vehicle group control method according to claim 1, wherein in the determining of the arrangement, the vehicle is disposed at a position closer to the head of the vehicle group as the periphery monitoring performance becomes higher.

4. The vehicle group control method according to claim 1, further comprising:

grasping a movement performance of each vehicle constituting the vehicle group, wherein in the determining of the arrangement, the arrangement of the vehicles within the vehicle group is determined on the basis of the movement performance and the periphery monitoring performance of each vehicle.

5. A vehicle group control device for controlling the arrangement of vehicles within a vehicle group including plural vehicles, the vehicle group control device comprising:

a periphery monitoring performance grasping unit which grasps a periphery monitoring performance of each vehicle constituting the vehicle group; and an arrangement determination unit which determines the arrangement of the vehicles within the vehicle group on the basis of the periphery monitoring performance of each vehicle.

6. The vehicle group control device according to claim 5, wherein the periphery monitoring performance grasping unit grasps the periphery monitoring performance on the basis of whether the vehicle includes information acquiring equipment, the performance of the information acquiring equipment included in the vehicle, the precision of information acquired by the vehicle, or the quantity of information acquired by the vehicle.

7. The vehicle group control device according to claim 5, wherein the arrangement determination unit disposes the vehicle at a position closer to the head of the vehicle group as its periphery monitoring performance becomes higher.

8. The vehicle group control device according to claim 5, further comprising:

a movement performance grasping unit which grasps a movement performance of each vehicle constituting the vehicle group, wherein the arrangement determination unit determines the arrangement of the vehicles within the vehicle group on the basis of the movement performance and the periphery monitoring performance of each vehicle.

* * * * *